United States Patent [19]
Pientka et al.

[11] Patent Number: 6,003,140
[45] Date of Patent: Dec. 14, 1999

[54] METHOD AND DEVICE FOR MONITORING AN ELECTRONIC COMPUTING UNIT

[75] Inventors: Rainer Pientka, Achern; Hans Meier, Ottersweier; Henry Blitzke, Buehl, all of Germany

[73] Assignee: Robert Bosch GmbH, Stuttgart, Germany

[21] Appl. No.: 08/913,406

[22] PCT Filed: Jan. 2, 1997

[86] PCT No.: PCT/DE97/00006

§ 371 Date: Sep. 17, 1997

§ 102(e) Date: Sep. 17, 1997

[87] PCT Pub. No.: WO97/26598

PCT Pub. Date: Jul. 24, 1997

[30] Foreign Application Priority Data

Jan. 19, 1996 [DE] Germany ............... 196 01 804

[51] Int. Cl.$^6$ ................................. G06F 11/00
[52] U.S. Cl. ........................................ 714/23
[58] Field of Search ............... 395/182.19, 182.2, 395/182.21, 750.01, 750.03, 750.07, 750.08; 340/468

[56] References Cited

U.S. PATENT DOCUMENTS

| | | | |
|---|---|---|---|
| 4,306,218 | 12/1981 | Leconte et al. | 340/468 |
| 4,586,179 | 4/1986 | Sirazisemir et al. | 714/22 |
| 4,879,647 | 11/1989 | Yazawa | 395/185.04 |
| 5,203,000 | 4/1993 | Folkes et al. | 395/182.21 |
| 5,341,497 | 8/1994 | Younger | 395/185.04 |
| 5,400,341 | 3/1995 | Makino et al. | 395/182.21 |
| 5,412,296 | 5/1995 | Chienming-Hsien et al. | 318/444 |
| 5,537,600 | 7/1996 | Fuoco et al. | 710/107 |
| 5,564,010 | 10/1996 | Henry et al. | 395/182.21 |

FOREIGN PATENT DOCUMENTS 0338455A  10/1989  Germany .

*Primary Examiner*—Robert W. Beausoliel, Jr.
*Assistant Examiner*—Pierre E. Elisca
*Attorney, Agent, or Firm*—Venable; George H. Spencer; Norman N. Kunitz

[57] ABSTRACT

The invention concerns a method and an arrangement for monitoring a computing unit, such as is used, for example, in control devices. The monitoring device generates a reset signal if the supply voltage drops below a voltage level, below which a defined operation is not ensured. Following the occurrence of a reset signal, a fixedly predetermined code is compared with the content of a volatile memory unit and a signal is emitted based on the comparison result, which determines the further process sequence. A fast and secure determination of the continued optimum process sequence is obtained by continuing with the control of the operating state as it exists at the time when the reset signal occurs, provided the content of the volatile memory unit coincides with the code, whereas a new initialization is carried out if the content of the volatile memory unit deviates from the code.

8 Claims, 1 Drawing Sheet

METHOD AND DEVICE FOR MONITORING AN ELECTRONIC COMPUTING UNIT

STATE OF THE TECHNOLOGY

The invention concerns a method for monitoring an electric computing unit for which a reset signal is transmitted from a voltage monitoring device to the computing unit, following an initialization of the computing unit, if there is no supply voltage or the supply voltage drops, and for which the operating state of the computing unit is checked following the occurrence of the reset signal by comparing a content of a volatile memory unit with a fixedly predetermined code and a decision is reached concerning the further control sequence. The invention directly relates to an arrangement for monitoring an electronic computing unit having at least one volatile memory unit with a code that is entered during an initialization; having a voltage monitoring device, which can be used to generate a reset signal for the computing unit if a supply voltage from a voltage source is not supplied or drops off; having a comparator unit for determining whether the content present in the volatile memory unit following the reset signal coincides with a predetermined code that corresponds to the entered code; and having a decision unit for emitting signals on the basis of the comparison result.

A method or an arrangement of this type is already known from the EP 0 163 670 B1. With this known method or this known arrangement, a reset signal is triggered for a computing unit if the voltage supply is interrupted or if the computing unit does not emit signals. If the computing unit does not emit signals, an external monitoring device in the form of a so-called watch-dog reset responds, for which a pattern typical for the watch-dog reset history known a-priori is present in at least a small portion of a volatile memory unit of the computing unit. A corresponding pattern from a non-volatile memory unit is loaded in for a comparison. If the values existing in the non-volatile memory unit correspond at least in part to the predetermined pattern, a decision is made that the reset signal comes from the monitoring device. If the values from the non-volatile memory unit do not coincide with the predetermined pattern, then it must be assumed that the reset signal is caused by an interruption in the voltage supply. With a reset signal coming from the monitoring device, a specific program sequence is set in motion, while the computing unit is initialized anew if the reset signal is the result of an interruption in the voltage supply. Such interruptions in the voltage supply, which trigger a reset signal, to be sure, but do not actually cause a malfunction in the computing unit cannot be distinguished clearly with this known device.

ADVANTAGES OF THE INVENTION

It is the object of the invention to provide a method or an arrangement of the aforementioned type, designed to distinguish easily and reliably between interruptions in the voltage supply that result in malfunctions in the computing unit and interruptions in the voltage supply that do not cause malfunctions in the computing unit.

SUMMARY OF THE INVENTION

The above object generally is achieved according to the method of the invention in that the reset signal is always emitted by the voltage monitoring device if the supply voltage drops below a voltage level, above which a defined operation of the computing unit is ensured; that for each reset signal, the content of the volatile memory unit is compared to the predetermined code and that for control purposes, the operating state existing at the time when the reset signal occurs is continued if the content of the volatile memory unit coincides with the code, whereas a new initialization is carried out if the code deviates from the content of the volatile memory unit. For this latter purpose a first signal is emitted by the decision unit if the content of the volatile memory unit deviates from the predetermined code, which signal triggers a re-initialization of the computing unit; and a second signal is emitted if the content coincides with the predetermined code, which results in a continuation of the control sequence on the basis of the operating state as it existed prior to the occurrence of the reset signal.

Since the reset signal is always emitted if the supply voltage drops below a voltage level, below which a defined operation of the computing unit is not ensured, and since for each reset signal a check is initiated on whether the content of the volatile memory unit still exists in full, it is not necessary to carry out an involved re-initialization of the computing unit in each case. If the content of the volatile memory unit still coincides with the entered, predetermined code, then the voltage drop with high certainty has not caused any malfunctions in the computing unit. In that case, a re-initialization or a further additional program sequence are not triggered, but the control sequence is continued on the basis of the operating state as it existed when the reset signal occurred. With this, the operating sequence is optimized with respect to security and speed of the control sequences. These measures have an advantageous effect, particularly if a control device for which the monitoring is provided does not have a device displaying the operating state to a user, since the user would only be able to determine with the aid of a non-existing function that the device is not active. In that case, the measures according to the invention can be realized with a program in the computing unit, without requiring additional external wiring.

A particularly simple embodiment of the method or the arrangement according to the number consists in that for a computing unit, for which the volatile memory unit comprises several memory blocks that are provided with a separate voltage supply line, a code element is entered into only one of a plurality of cells for each memory block during the initialization, or in that for a computing unit, for which the volatile memory unit is divided into blocks with respectively several storage cells and where only one voltage supply line is provided for each block, a value is entered into only one storage cell respectively. Although easy to realize, the method consequently always provides a check to ensure that the code is entered during each initialization from a non-volatile memory unit into a volatile memory unit.

For an embodiment of the device with advantageous circuitry, the voltage monitoring arrangement is designed as a component, which also has a voltage regulator.

The method or arrangement can be used advantageously for a windshield wiper control device, since the computing unit reacts optimally and automatically to malfunctions and the control sequence continues without disturbing the driver.

The invention is explained in the following in more detail with the aid of an embodiment and by referring to the drawings.

DETAILED DESCRIPTION OF THE PREFERRED EMBODIMENT

Figure 1:
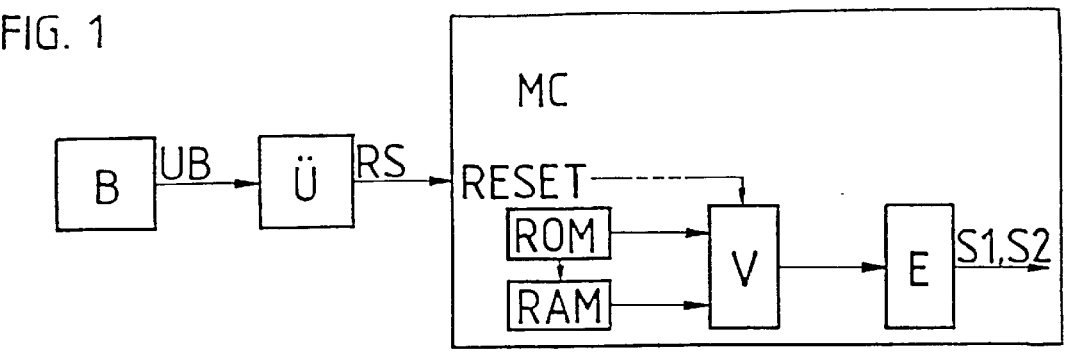
FIG. 1 is a block diagram of an arrangement for monitoring an electronic computing unit.

FIG. 1 shows an arrangement for monitoring an electronic computing unit, such as can be used, for example, for a windshield wiper control device of a motor vehicle. A voltage source in the form a battery B provides a supply voltage UB, which is processed in a voltage monitoring device Ü and is made available to the various consumers or loads. A voltage regulator is provided in the voltage monitoring device Ü for this. The voltage monitoring device Ü additionally has a reset device, which transmits a power-on reset signal to a computing unit MC for an activation of the control device and an undervoltage reset signal for a short-term drop in the supply voltage below a level that can lead to an undefined state. The computing unit MC comprises a non-volatile memory unit ROM, a comparator unit V as well as a decision unit E. The decision unit E emits a first or a second signal S1 or S2, depending on the result of a comparison generated in the comparator unit V between a code for the non-volatile memory unit ROM and the content of the volatile memory unit RAM, which signals are used to determine the further process sequence following the occurrence of a reset signal.

Figure 2:
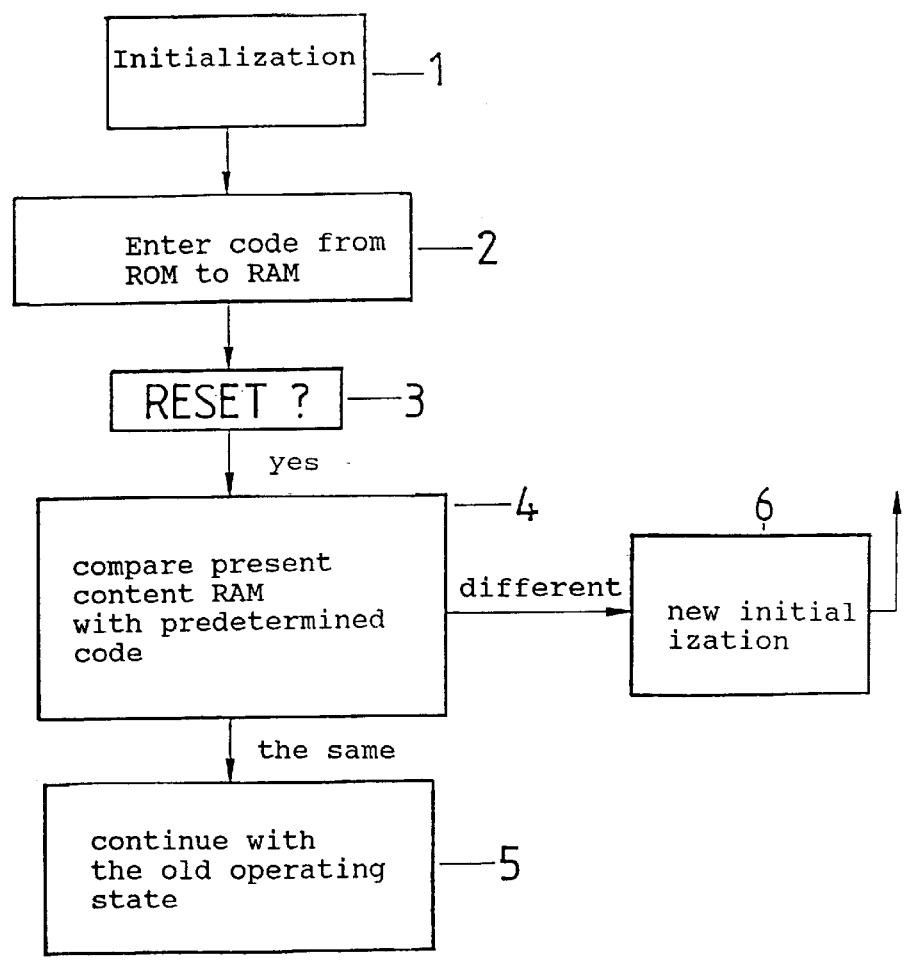
FIG. 2 shows the essential process steps for monitoring the electronic computing unit.

FIG. 2 contains a flow diagram showing the process sequence for the monitoring. During an initialization 1, the code existing in a non-volatile memory unit ROM is entered in a step 2 into the volatile memory unit RAM. If a reset signal is detected in a step 3, following initialization, then the current content of the RAM is compared in the comparator unit V with the predetermined code from the non-volatile memory unit ROM. If the content of the volatile memory unit RAM has remained unchanged as compared to the entered, predetermined code that corresponds to the code from the non-volatile memory unit ROM, then the operating state existing at the time when the reset signal occurs is continued in the control sequence. If the current content of the volatile memory unit RAM deviates from the predetermined code, then a new initialization of the computing unit with testing and deleting of the volatile memory unit RAM is carried out, so that the desired control sequence can once more run in a defined way.

The described set-up and sequence, for example, can be carried out easily with computer families, where the volatile memory unit RAM is divided into several blocks, e.g. with 16 bytes each, and each of these blocks has a voltage supply line that supplies all 16 bytes. If the voltage drops below a voltage level, below which a defined operation is not ensured, the complete block and not an individual cell in a block will always change if a malfunction occurs in the computing unit MC. In order to detect a data loss caused by undervoltage or a power-on-reset and to distinguish it from a short-term interruption in the supply voltage, which does not cause a malfunction, it is therefore sufficient to enter a constant or a code element into only one cell of each block, which subsequently can be compared following the appearance of a reset signal.

With the described measures, it is possible without much expenditure to determine reliably whether a malfunction has occurred in the computing unit when a reset signal appears and to continue in an optimum way with the control sequence, without triggering unnecessary program sequences.

What is claimed is:

1. A method for monitoring an electric computing unit, in which, following an initialization of the computing unit, a reset signal is transmitted by a voltage monitoring device to the computing unit if there is no supply voltage or the supply voltage drops, and in which the operating state of the computing unit is checked following the occurrence of the reset signal by comparing a content of a volatile memory unit with a fixedly predetermined code and a decision is reached concerning the further control sequence of the computing unit, and wherein the reset signal is always emitted by the voltage monitoring device if the supply voltage drops below a voltage level, above which is defined operation of the computing unit is ensured, for each reset signal, the content of the volatile memory unit is compared to the predetermined code, and the control sequence of the computing unit permitted to continue with the operating state existing at the time when the reset signal occurs if the content of the volatile memory unit coincides with the code, whereas a new initialization of the computing unit is carried out if the content of the volatile memory unit deviates from the code.

2. A method according to claim 1, wherein for a computing unit where the memory unit has a plurality of storage blocks having respectively one voltage supply line, a code element is entered into only one of several cells of each memory block during the initialization.

3. A method according to claim 1, wherein during each initialization, the code is entered from a non-volatile memory unit into the volatile memory unit.

4. In a method of operating a windshield wiper control device, the steps of the method defined in claim 1.

5. An arrangement for monitoring an electronic computing unit, comprising; at least one volatile memory unit into which a code is entered during an initialization of the computing unit; a voltage monitoring device, with which a reset signal for the computing is generated if the supply voltage provided by a voltage source is not supplied or if the supply voltage drops below a predetermined voltage level; a comparator unit for detecting whether the content present in the volatile memory unit following the reset signal conforms to a predetermined code that coincides with the entered code; and a decision unit for emitting signals on the basis of the comparison result, wherein a first signal (S1) is emitted by the decision unit (E) if the content of the volatile memory unit (RAM) deviates from the predetermined code, which first signal triggers a re-initialization of the computing unit (MC), and a second signal (S2) is emitted by the decision unit if it is determined that the content of the volatile memory coincides with the predetermined code, which second signal causes the control sequence of the computing unit to be continued on the basis of the operating state existing prior to the occurrence of the reset signal (RS).

6. An arrangement according to claim 5, wherein for a computing unit (MC) where the volatile memory unit (RAM) is divided into blocks with respectively several storage cells and where only one voltage supply line is provided for each block, a value is entered into only one memory cell of a respective block.

7. An arrangement according to claim 5, wherein the voltage monitoring device (Ü) is a component, which also comprises a voltage regulator.

8. In a windshield wiper control device, the arrangement according to claim 5.

\* \* \* \* \*